(12) United States Patent
Candelore (10) Patent No.: US 12,520,017 B2
(45) Date of Patent: Jan. 6, 2026

(54) TRACKING CONTENT WITH ARTIFICAL INTELLIGENCE AS IT IS CONSUMED

(71) Applicant: Sony Group Corporation, Tokyo (JP)

(72) Inventor: Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 131 days.

(21) Appl. No.: 18/328,533

(22) Filed: Jun. 2, 2023

(65) Prior Publication Data

US 2024/0406518 A1  Dec. 5, 2024

(51) Int. Cl.
*H04N 21/84* (2011.01)
*H04N 21/6587* (2011.01)

(52) U.S. Cl.
CPC ......... *H04N 21/84* (2013.01); *H04N 21/6587* (2013.01)

(58) Field of Classification Search
CPC ..... H04N 21/84; H04N 21/6587; G06V 10/70
See application file for complete search history.

(56) References Cited

U.S. PATENT DOCUMENTS

| | | | |
|---|---|---|---|
| 12,079,587 B1 * | 9/2024 | Radford | G06F 40/58 |
| 2018/0232662 A1 * | 8/2018 | Solomon | H04R 3/005 |
| 2021/0365833 A1 * | 11/2021 | Braddy | G06F 16/2379 |
| 2021/0375324 A1 | 12/2021 | Morton et al. | |
| 2023/0084372 A1 | 3/2023 | Candelore | |
| 2023/0091730 A1 * | 3/2023 | Kalathuru | H04N 21/44209 725/139 |
| 2023/0244506 A1 * | 8/2023 | Geller | G06F 3/04847 715/764 |
| 2023/0281248 A1 * | 9/2023 | Schalkwyk | G06F 16/7844 707/749 |
| 2024/0046669 A1 * | 2/2024 | Kavuri | G06V 10/82 |
| 2024/0292073 A1 * | 8/2024 | Khalil | G06V 20/46 |
| 2024/0403087 A1 * | 12/2024 | Davis | G06F 9/455 |

FOREIGN PATENT DOCUMENTS

| | | |
|---|---|---|
| CN | 113992929 A | 1/2022 |
| CN | 116127046 A | 5/2023 |

OTHER PUBLICATIONS

Abhiramon Rajasekharan et al: "Reliable Natural Language Understanding with Large Language Models and Answer Set Programming", EPTCS 385, 2023, pp. 274-287.
"Cloud Video Intelligence API", Google Cloud, retrieved from https://cloud.google.com/video-intelligence.

* cited by examiner

*Primary Examiner* — Michael R Telan
(74) *Attorney, Agent, or Firm* — John M. Rogitz; John L. Rogitz (57) ABSTRACT

A user starts playback of an audio or AV program, which starts up a large language model (LLM) such as a generative pre-trained transformer. The LLM follows the program with the user as the program is being watched. Audio is converted to text and video is converted to text-based description. The LLM essentially trains on the resulting "corpus" so that should the user subsequently want to access part of the program using a simple conversational query about the program, the LLM can provide the answer.

20 Claims, 5 Drawing Sheets

TRACKING CONTENT WITH ARTIFICAL INTELLIGENCE AS IT IS CONSUMED

FIELD

The present application relates to technically inventive, non-routine solutions that are necessarily rooted in computer technology and that produce concrete technical improvements, particularly to tracking content with AI as the content is consumed by a viewer or listener.

BACKGROUND

As understood herein, people who enjoy an audio-only program or audio-video (AV) program, even if lengthy, may not want to necessarily skip any portions. As a consequence, they may not prefer to access a summary that condenses everything in the program.

SUMMARY

As also understood herein, it may be difficult for people to remember certain content details, especially in a lengthy program such as one with many episodes or seasons and very long movies, podcasts, and the like. Present principles understand that machine learning (ML) can help with cognitive issues. Techniques herein are directed to this and account for a lack of corpus of material because the content is a screen play or text is not available or easily obtained. Moreover, present techniques account for a lack of connectivity since the ML-generated metadata is based on the content being consumed itself which might be only locally played back. In this way, present principles resolve the necessity of a viewer having to replay the entire content to find what he is searching for when a video or audiobook for example becomes too difficult to follow, causing the viewer to lose interest in the plotline and quit watching the program.

Accordingly, an apparatus includes at least one computer memory that is not a transitory signal and that in turn includes instructions executable by at least one processor assembly to receive a command to present audio and/or audio video (AV) content on a display. The instructions are executable to, responsive to the command, start to play the content, and also responsive to the command, start at least one machine learning (ML) model to receive audio and/or video being played in the content. The instructions are executable to use the audio and/or video in the content to train at least one large language model (LLM). Moreover, the instructions are executable to receive at least one query related to the content, input the query to the LLM, receive from ML model a response to the query, and present the response on at least one output device.

In some examples the ML model includes at least one generative pre-trained transformer. If desired, the instructions can be executable to use the audio and/or video in the content to train the LLM at least in part by converting at least one of: the audio, the video, to text and inputting the text to the LLM.

In non-limiting implementations the content can be played by a content player and the instructions may be executable to provide indication to the LLM of at least a first command input to the content player. The LLM can be executed by the content player. The first command can be a stop or pause command or a trick play command.

The ML model can be separate from the LLM or the LLM may include the ML model.

In another aspect, a method includes playing content using a content player, and as the content is being played, using the content to train at least one machine learning (ML) model. The method includes using the ML model to return at least one response to at least one query about the content.

In another aspect, an apparatus includes at least one processor assembly configured to invoke at least one machine learning (ML) model to consume information related to content as the content is being played on at least one output device to train the ML model, and to use the ML model to respond to at least one query about the content.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g., smart TVs, Internet-enabled TVs), portable computers such as laptops and tablet computers, and other mobile devices including smart headphones, smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. A processor assembly may include one or more processors.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g., computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVDD 12 and/or other computers described herein is configured to undertake present principles (e.g., communicate with other CE devices to undertake present principles, execute the logic described herein, and perform any other functions and/or operations described herein).

Figure 1:
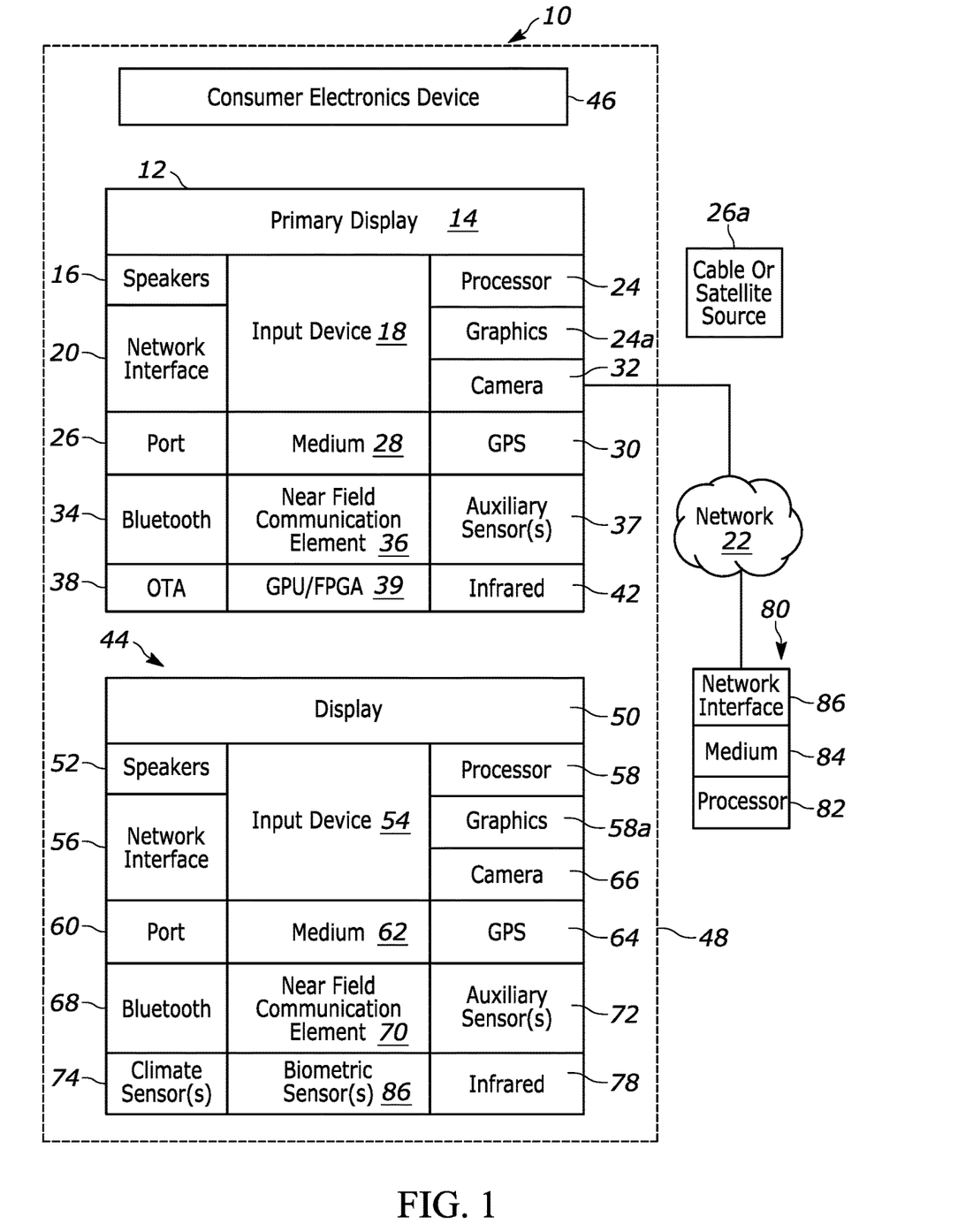
FIG. 1 is a block diagram of an example system in accordance with present principles.

Accordingly, to undertake such principles the AVDD 12 can be established by some, or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g., an audio receiver/microphone for e.g., entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g., controlling the display 14 to present images thereon and receiving input therefrom. Furthermore, note the network interface 20 may be, e.g., a wired or wireless modem or router, or other appropriate interface such as, e.g., a wireless telephony transceiver based on 5G, or Wi-Fi transceiver as mentioned above, etc.

In addition to the foregoing, the AVDD 12 may also include one or more input ports 26 such as, e.g., a high-definition multimedia interface (HDMI) port or a USB port to physically connect (e.g., using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g., receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g., determine the location of the AVDD 12 in e.g., all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g., for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) and/or a field-programmable gate array (FPGA) 39. The GPU and/or FPGA 39 may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g., an audio receiver/microphone for e.g., entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g., controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g., using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g., determine the location of the first device 44 in e.g., all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first device 44 may include still other sensors such as e.g., one or more climate sensors 74 (e.g., barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In a specific example as a large language model (LLM) such as a generative pre-trained transformer (GPTT), sometimes referred to as a "chatbot", may be used.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

In a specific embodiment, a ML model may employ a transformer-based neural network architecture such as a generative pre-training transformer trained on a large dataset of text and to generate human-like text, convertible to speech, in response to a query.

Figure 2:
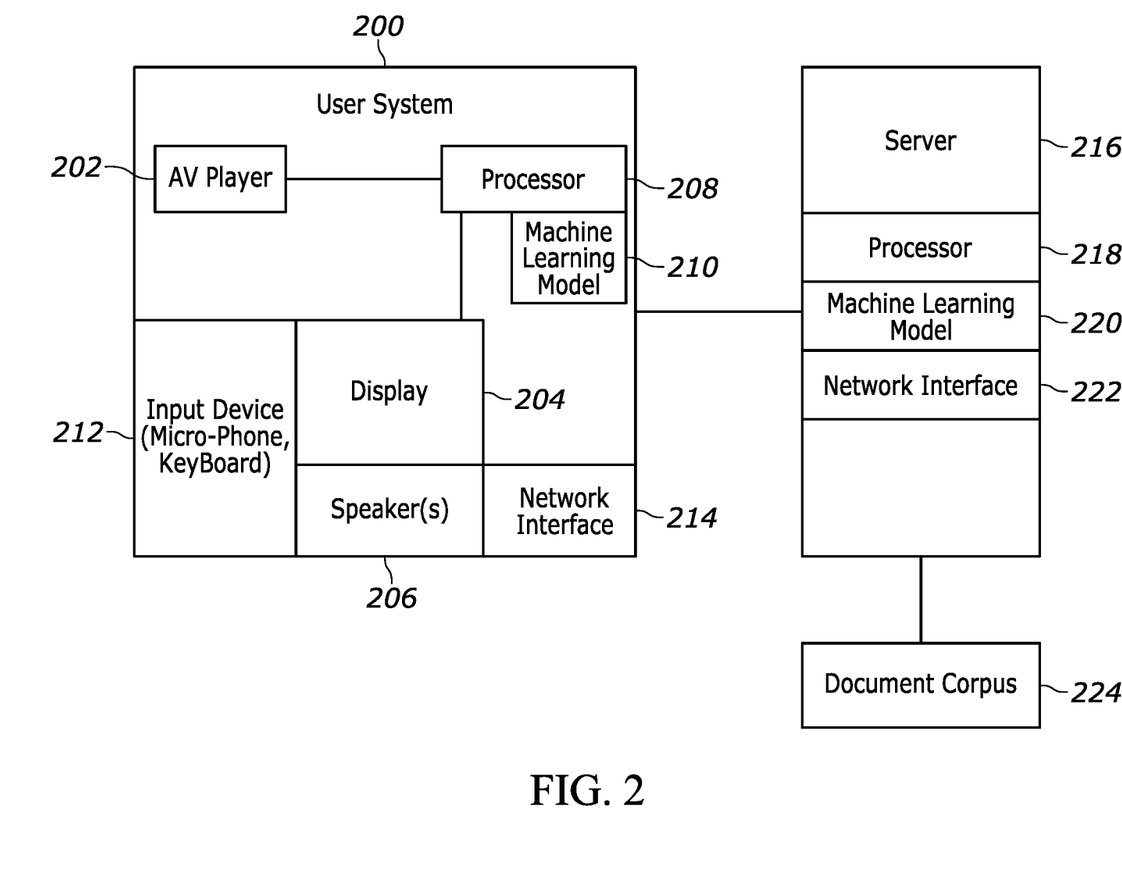
FIG. 2 illustrates an example user system with an AV player in cooperation with one or more servers.

FIG. 2 illustrates a user system 200 that may be implemented by any of the devices described above for presenting AV content sourced by an AV player 202 on a video display 204 and/or speakers 206 under control of one or more processors 208 accessing instructions on computer storage media.

The AV content can be, e.g., movies, shows, music (audio-only), text such as e-book text, and the like.

The processor 208 may execute one or more machine learning (ML) models 210 for purposes to be shortly disclosed. The processor 208 may receive queries about the AV content by means of one more input devices 212 such as microphones, key boards or key pads, etc. and send those queries via one or more network interfaces 214 to one or more Internet or other wide area network serves 216 having one or more processors 218 executing one or more ML models 220 to return responses to the queries to the user system 200 via one or more network interfaces 222. In executing the ML model, the server processor 218 may access a document corpus 224 such as network sites on the Internet or other locations described herein. In some examples the ML model 220 of the server may be implemented by a LLM such as a transformer-based neural network architecture such as a generative pre-training transformer establishing a "chatbot." The ML model may be executed on the user's local computer, mobile phone, or as part of the player application.

Figure 3:
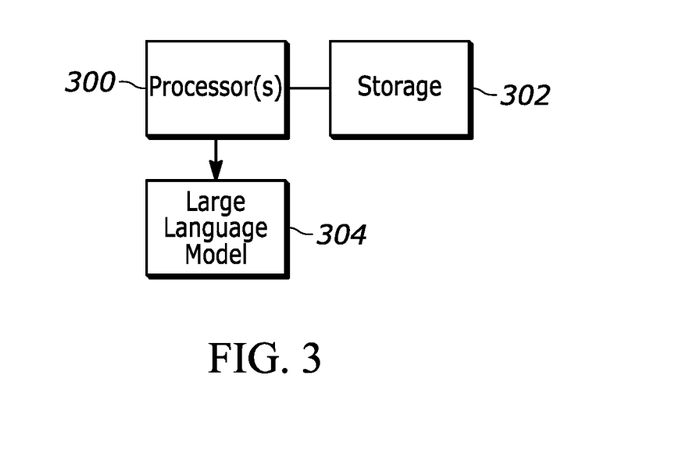
FIG. 3 illustrates a first example machine learning (ML) system consistent with present principles.

FIG. 3 illustrates a first example arrangement in which a processor assembly 300 accesses one or more computer memories or storages 302 to execute one or more LLMs 304. The LLM 304 shown in FIG. 3 is configured to learn from text derived from audio and video, and also to convert audio (via speech-to-text processing) into text and to convert video (via video-to-text processing) to text describing the video scenes and characters.

Figure 4:
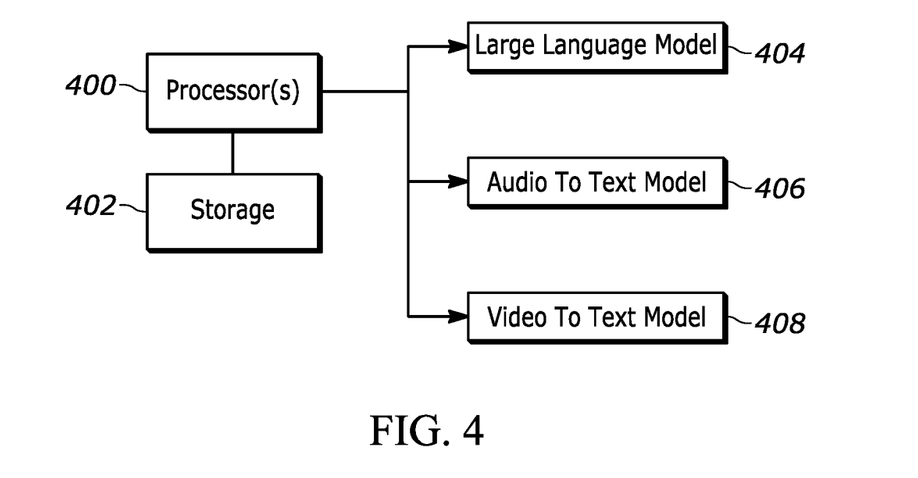
FIG. 4 illustrates a second example machine learning (ML) system consistent with present principles.

On the other hand, FIG. 4 illustrates a second example arrangement in which a processor assembly 400 accesses one or more computer memories or storages 402 to execute one or more LLMs 404. The LLM 404 shown in FIG. 3 is configured to learn from text derived from audio and video. However, unlike the LLM 304 shown in FIG. 3, the LLM 404 shown in FIG. 4 need not be configured to convert audio and video to text. Instead, an audio-to-text ML model 406 converts audio to text, which is input to the LLM, while a video-to-text ML model 408 converts video (via video-to-text processing) to text describing the video scenes and characters for input to the LLM.

Figure 5:
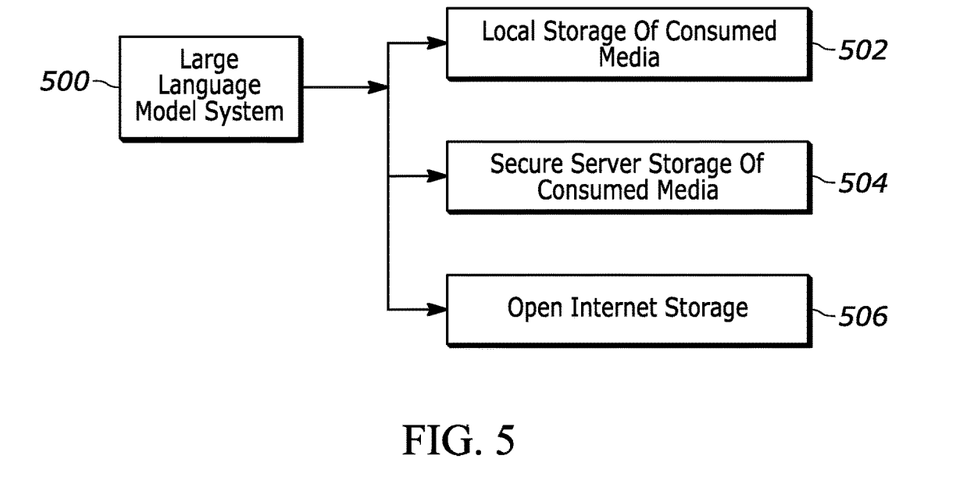
FIG. 5 illustrates an example LLM system architecture.

FIG. 5 illustrates an example LLM system 500 such as either one of the systems of FIGS. 3 and 4 that accesses, for learning purposes, a local storage 502 containing media such as audio and/or audio video programs a user has consumed (watched or listened to) or is currently consuming. The local storage 502 typically is not accessible via a wide area network such as the Internet or if it is, typically is protected by authentication measures to prevent public access. The local storage 502 typically is local to the user's playback system, e.g., in the same home as the playback system, and may be part of a media player such as the AV player 202 shown in FIG. 2.

FIG. 5 further illustrates that the LLM system 500 may access, for learning purposes, a secure server storage 504 containing media such as audio and/or audio video programs a user has consumed or is currently consuming. The server storage 504 typically is not accessible via a wide area network such as the Internet or if it is, typically is protected by authentication measures to prevent public access. The server storage 504 may be local to the user's playback system or it may be accessible to the user's system, upon proper authentication, via the Internet.

FIG. 5 also shows that the LLM system 500 may access open Internet storage 506 from multiple Internet sites.

In one example, the LLM system 500 trains only on text converted from audio and video and stored in the local storage 502 for purposes of executing the logic of FIG. 6 described below. It does not train on information in the secure server storage 504 or the open Internet storage 506 for purposes of executing the logic of FIG. 6 described below. In this example, the LLM system such as ChatGPT4 that is implemented using a learning model may not actually have a large corpus of material to analyze. In other words, there might not actually be a "large corpus" of reference material other than the content itself and/or text derived from the content itself.

In another example, the LLM system 500 trains only on text converted from audio and video and stored in the local storage 502 and in the secure swerver storage 504 for purposes of executing the logic of FIG. 6 described below. It does not train on information in the open Internet storage 506 for purposes of executing the logic of FIG. 6 described below. In another example, the LLM system 500 may train on information in all three storages shown in FIG. 5 for purposes of FIG. 6.

Figure 6:
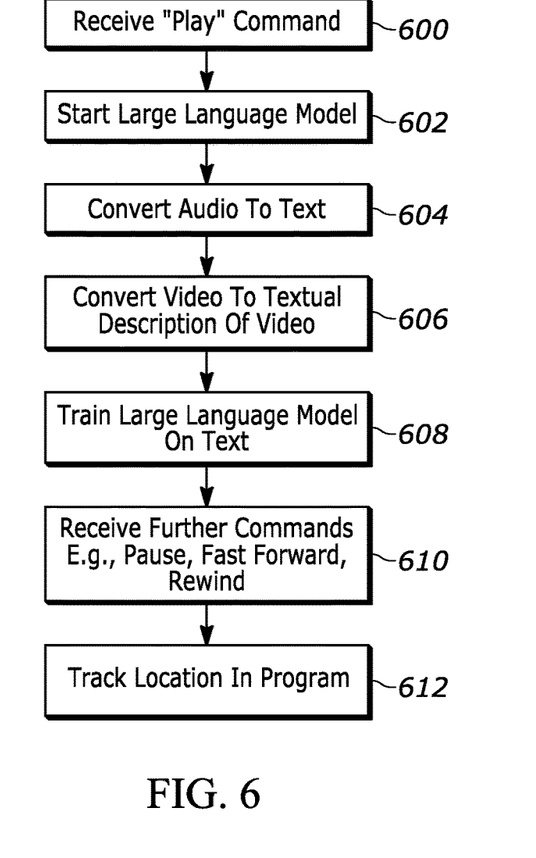
FIG. 6 illustrates example training logic in example flow chart format consistent with present principles.
Figure 7:
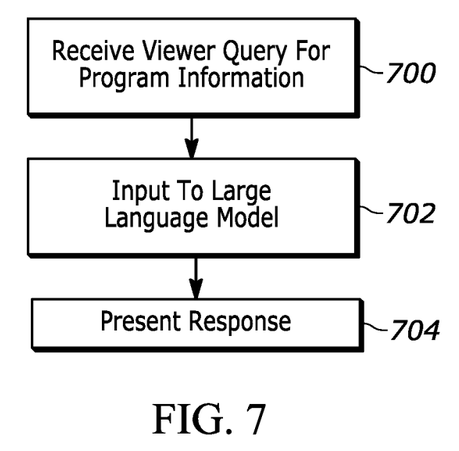
FIG. 7 illustrates example query logic consistent with present principles.

Turn now to the afore-mentioned FIG. 6, which illustrates that artificial intelligence (AI) such as any of the ML models described herein, including the LLM systems, tracks content (audio only or AV) while it is being consumed by a person. The AI is enabled whenever the content player is invoked. Thus, at block 600, a play command, for instance from an AV player, may be received and in response any of the LLMs described herein started or invoked at block 602 to follow along real time with the person both as the content is paused and played to the end. As shown in FIG. 7, the AI is able to then answer questions about the content from the person.

To achieve this, as the media is being consumed, audio is converted to text at block 604 using techniques described above, and at block 606 text describing video is generated using techniques described herein. The LLM is trained on this text from blocks 604 and 606 at block 608 to learn what is in the media that has been consumed. Block 610 indicates that further commands may be input to the AI, such as pause/stop and trick play commands such as fast forward and rewind. These commands are noted by the AI, which keeps track of where in the media stream the person currently is at block 612. A pause or stop command in some cases causes the AI/LLM to stop learning, as there is no media being consumed.

It will be appreciated that any query input by the person at that point, as at block 700 in FIG. 7 and input to the AI/LLM at block 702, may be responded to by the LLM based only on the learning it has achieved from the portion of the media that has already been consumed, and not from any portion of the media beyond that which has been consumed. The response to any query is presented at block 704. The query may be a natural language query either spoken or signed or typed by the person.

Figure 8:
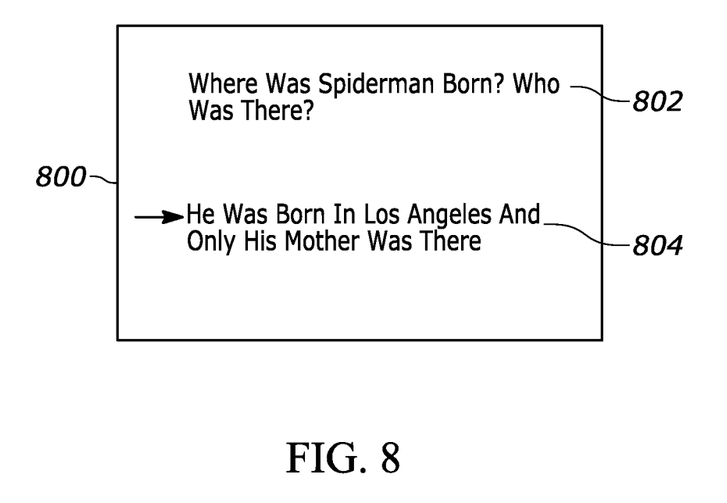
FIG. 8 illustrates an example output device consistent with FIG. 6.

FIG. 8 illustrates an output device 80 such as any display or other output device described herein in which a compound natural language query 802 is indicated. A response 804 is presented based on the learning that the AI/LLM has undertaken up to the point in the media at which the person has consumed the media. In other embodiments the AI/LLM may access information regarding the entire program/media and train on that regardless of where the person is in consuming the program/media.

It might be possible for the AI to follow along in a Zoom meeting and take notes and possibly write-down action items. The content in this case would be the "Zoom meeting". So this would be more than doing a speech-to-text conversion transcript.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   at least one computer memory that is not a transitory signal and that comprises instructions executable by at least one processor assembly to:
   receive a command to present audio and/or audio video (AV) content on a display;
   responsive to the command, start to play the content;
   responsive to the command, start at least one machine learning (ML) model to receive audio and/or video being played in the content;
   use the audio and/or video in the content to train at least one large language model (LLM);
   receive a stop or pause command;
   responsive to receipt of the stop or pause command, stop training the LLM and stop playing the content;
   while content play is stopped, receive at least one query related to the content;
   input the query to the LLM;
   receive from ML model a response to the query, the response comprising content information only up to the point in the content at which play was stopped; and
   present the response on at least one output device.

2. The apparatus of claim 1, wherein the AV content is a video conference.

3. The apparatus of claim 2, wherein the response to the query indicates an action item from the video conference.

4. The apparatus of claim 1, wherein the query related to the content is signed by a user.

5. The apparatus of claim 1, wherein the instructions are executable to:
   convert video of the content into text describing video scenes indicated in the content; and
   use the text to train the LLM.

6. The apparatus of claim 1, wherein the instructions are executable to:
   convert video of the content into text describing characters indicated in the content; and
   use the text to train the LLM.

7. The apparatus of claim 1, wherein the instructions are executable to:
   convert video of the content into text describing video scenes and characters indicated in the content; and
   use the text to train the LLM.

8. A method, comprising:
   receiving a command to present content on a display;
   responsive to the command, playing the content using a content player;
   responsive to the command, starting at least one machine learning (ML) model to receive audio and/or video being played in the content;
   as the content is being played, using the content to train the ML model;
   receiving a stop or pause command;
   responsive to receipt of the stop or pause command, stopping training the ML model and stopping playing the content;
   while content play is stopped, receiving at least one query related to the content; and
   using the ML model to return at least one response to the at least one query about the content, the response comprising content information only up to the point in the content at which play was stopped.

9. The method of claim 8, wherein the content is a video conference.

10. The method of claim 9, wherein the at least one response indicates an action item from the video conference.

11. The method of claim 8, comprising:
presenting the response at a client device.

12. The method of claim 8, comprising:
converting video of the content into text describing video scenes indicated in the content; and
using the text to train the ML model.

13. The method of claim 8, comprising:
converting video of the content into text describing characters indicated in the content; and
using the text to train the ML model.

14. The method of claim 8, comprising:
converting video of the content into text describing video scenes and characters indicated in the content; and
using the text to train the ML model.

15. An apparatus comprising:
at least one processor assembly configured to:
receive a command to present audio and/or video content on a display;
responsive to the command, start to play the content;
responsive to the command, invoke at least one machine learning (ML) model to consume information related to content as the content is being played on at least one output device to train the ML model;
receive a stop or pause command;
responsive to receipt of the stop or pause command, stop invoking the ML model to consume information related to the content and stop playing the content;
while content play is stopped, receive at least one query related to the content; and
use the ML model to provide a response to the at least one query about the content, the response comprising content information only up to the point in the content at which play was stopped.

16. The apparatus of claim 15, wherein the processor assembly is configured to train the ML model only on portions of the content that have been played to train the ML model to respond to the query.

17. The apparatus of claim 15, wherein the processor assembly is configured to train the ML model on more than portions of the content that have been played to train the ML model to respond to the query.

18. The apparatus of claim 15, wherein the instructions are executable to:
convert video of the content into text describing video scenes indicated in the content; and
use the text to invoke the ML model.

19. The apparatus of claim 15, wherein the instructions are executable to:
convert video of the content into text describing characters indicated in the content; and
use the text to invoke the ML model.

20. The apparatus of claim 15, wherein the instructions are executable to:
convert video of the content into text describing video scenes and characters indicated in the content; and
use the text to invoke the ML model.

* * * * *